United States Patent [19]

Sagawa et al.

[11] Patent Number: 4,921,912
[45] Date of Patent: May 1, 1990

[54] EPOXY RESIN COMPOSITION CONTAINING ACRYLIC OLIGOMER, AMINE AND AMINE-TERMINATED NITRILE RUBBER

[75] Inventors: Hirotoshi Sagawa; Seiji Yamaguchi, both of Hyogo, Japan

[73] Assignee: Ciba-Geigy Corporation, Ardsley, N.Y.

[21] Appl. No.: 231,665

[22] Filed: Aug. 1, 1988

Related U.S. Application Data

[63] Continuation of Ser. No. 8,881, Jan. 30, 1987, abandoned.

[30] Foreign Application Priority Data

Feb. 3, 1986 [JP]  Japan ................................ 61-20156

[51] Int. Cl.$^5$ .......................... C08L 9/02; C08L 63/10
[52] U.S. Cl. .................................... 525/112; 525/113; 525/115; 525/119
[58] Field of Search ................ 525/108, 112, 113, 119

[56] References Cited

FOREIGN PATENT DOCUMENTS 57-192427  11/1982  Japan .................................... 525/108

OTHER PUBLICATIONS

Oligomer Handbook, Kagaku Kogyo Nippo-sha, Mar. 1977, pp. 255–257.
Toagosei Chemical Industry Co., Ltd. Bulletin, "Aronix Acrylic Type Oligomers," Tokyo, Japan, 8 pages.
B. F. Goodrich Co. Bulletin, "Improving Epoxy Resins," RLP-4, Cleveland, Ohio, 18 pages.

*Primary Examiner*—John C. Bleutge
*Assistant Examiner*—Robert E. L. Sellers, II
*Attorney, Agent, or Firm*—Harry Falber

[57] ABSTRACT

An epoxy resin composition useful as an adhesive comprises (a) 100 parts by weight of an epoxy resin or a mixture of epoxy resins, (b) from 1–20 parts by weight of an acrylic oligomer, (c) from 5–150 parts by weight of an amine, and (d) from 10–200 parts by weight of a nitrile rubber having a terminal amine group.

8 Claims, No Drawings

EPOXY RESIN COMPOSITION CONTAINING ACRYLIC OLIGOMER, AMINE AND AMINE-TERMINATED NITRILE RUBBER

This is a continuation of Ser. No. 07/008,881 filed Jan. 30, 1987, now abandoned.

DETAILED DESCRIPTION OF THE INVENTION

The present invention relates to an epoxy resin composition. More particularly, it relates to a rapid-curing epoxy resin composition capable of giving a cured product having a high impact strength, a high peeling strength, an excellent heat resistance and an excellent hot water resistance.

1. Prior Art

Owing to its high heat resistance, durability and rust-proofing property, epoxy resin is in use in a wide variety of fields including adhesives, surface coating material and the like. When used as an adhesive, however, the hitherto known epoxy resins cannot give a cured product having high impact strength and peeling strength enough to fulfil the requirements. Further, the velocity of their cure cannot be controlled at will. Accordingly, extention of their use has naturally been limited.

As the first class of the hitherto known epoxy resins, those comprising an epoxy resin an active aliphatic amine or mercaptan having a low molecular weight for the purpose of maintaining a high shearing strength and a high curing velocity while retaining the heat resistance and durability of the resin itself can be referred to (cf. "New Epoxy Resins", published by Shoukohdo, May 1985, pp. 251, 167 and 566). As the second class of the hitherto known epoxy resins compositions, those comprising an epoxy resin, an amine compound and an acrylic oligomer for the purpose of improving the curing velocity can be referred to (cf. "Oligomer Handbook", published by Kagaku Kogyo Nippo-sha, March 1977, p. 256). As the third class of the hitherto known epoxy resin compositions, those comprising an epoxy resin, an amine compound and a nitrile rubber having terminal amino group can be referred to (cf. C. K. Riew: "Rubber Chemistry & Technology", Vol. 54, No. 2, 1981).

In the first class of compositions, the density of crosslinkage becomes very high due to the compounded curing agent, so that the cured product obtained therefrom is quite brittle and cannot be expected to have a sufficient peeling strength and a high impact strength. Further, since the compounded curing agent is volatile, there is a problem in the phase of stability. Further, mercaptans have an unpleasant odor.

Although the second class of compositions are improved in curing velocity, the cured product obtained therefrom is insufficient in the density of crosslinkage, and therefore it is insufficient in the points of impact strength and peeling strength.

In the third class of compositions, the cured product obtained therefrom is somewhat improved in impact strength and peeling strength owing to the compounded nitrile rubber having terminal amino group. However, the curing reaction cannot progress smoothly, and the curing velocity is very low.

Thus, it has been desired in this field of the industry to develop a rapid-curing epoxy resin composition capable of giving a cured product having a high impact resistance, a high peeling strength, an excellent heat resistance and an excellent hot water resistance.

2. Means for the Solution of the Problems

The present inventors have conducted elaborated studies with the aim of developing an epoxy resin composition endowed with the above-mentioned properties with a good balance. As the result, it has been found that, by adding both of an acrylic oligomer and a nitrile rubber having terminal amino group to a mixture system consisting of an epoxy resin and an amine compound, two kinds of crosslinking reactions rapidly progress either stepwise or competitively to elevate the density of crosslinking, so that there is obtained a cured product having much improved impact strength and peeling strength and having excellent heat resistance and hot water resistance. Based on this finding, the present invention has been accomplished.

Thus, the epoxy resin composition of the present invention is characterized by comprising the following (a), (b), (c) and (d):

| | |
|---|---|
| (a) Epoxy resin | 100 parts by weight |
| (b) Acrylic oligomer | 1.0-20 parts by weight |
| (c) Amine compound | 5-150 parts by weight |
| (d) Nitrile rubber having amino terminal group | 10-200 parts by weight. |

The epoxy resin used as ingredient (a) of the invention may be any substance, so far as it is generally known as an epoxy resin. Its examples include Bisphenol A type epoxy resin, novolac type epoxy resin, hydrogenated Bisphenol A diglycidyl ether type resin, Bisphenol A side chain type diglycidyl ether resin, urethane-modified epoxy resin, resorcin diglycidyl ether epoxy resin, glycidyl ester type epoxy resin, p-oxybenzoic acid diglycidyl ether-ester resin, alicyclic epoxy resins and glycidylamine epoxy resins. As the commercially available articles belonging to these resins, Araldite GY-252 (trade name, manufactured by Ciba Geigy), Araldite GY-250 (trade name, manufactured by Ciba Geigy), Araldite GY-260 (trade name, manufactured by Ciba Geigy), Araldite GY-280 (trade name, manufactured by Ciba Geigy), EPN-1138 (trade name, manufactured by Ciba Geigy), ECN-1235 (trade name, manufactured by Ciba Geigy), Adeka Resin EP-4080 (trade name, manufactured by ASAHI DENKA KOGYO K.K.), Adeka Resin EP-4000 (trade name, manufactured by ASAHI DENKA KOGYO K.K.), Adeka Resin EPV-4 (trade name, manufactured by ASAHI DENKA KOGYO K.K.), Adeka Resin EPV-6 (trade name, manufactured by ASAHI DENKA KOGYO K.K.), Adeka Resin EPV-8 (trade name, manufactured by ASAHI DENKA KOGYO K,K,), SUMI-Epoxy ELR-130 (trade name, manufactured by Sumitomo Chemical), SUMI-Epoxy ELR-150 (trade name, manufactured by Sumitomo Chemical), Araldite CY-183 (trade name, manufactured by Ciba Geigy), Araldite CY-182 (trade name, manufactured by Ciba Geigy), SUMI-Epoxy Resin ELP-160 (trade name, manufactured by Sumitomo Chemical), Araldite CY-179 (trade name, manufactured by Ciba Geigy), Araldite CY-178 (trade name, manufactured by Ciba Geigy), Araldite CY-180 (trade name, manufactured by Ciba Geigy), Araldite CY-175 (trade name, manufactured by Ciba Geigy), Araldite MY 720 (trade name, manufactured by Ciba Geigy), Araldite MY 500 (trade name, manufactured by Ciba Geigy) and Araldite MY 510

(trade name, manufactured by Ciba Geigy) can be referred to, for example. These epoxy resins are used either in the form of single substance or in the form of a mixture of two or more members. It is preferable to use Araldite GY-260 as the main component among these epoxy resins, because of its multi-purpose applicability and low viscosity.

The acrylic oligomer used as ingredient (b) of the invention may be any substance, so far as it has at least one acryloyloxy group or methacryloyloxy group in one molecule, as a functional group. For example, a condensate of a compound having alcoholic hydroxyl group and acrylic acid and an addition product of epoxy compound and acrylic acid can be used for this purpose. Its concrete examples include dimethylaminoethyl acrylate, diethylaminoethyl acrylate, 2-hydroxyethyl acrylate, 2-hydroxypropyl acrylate, acryloyloxyethyl hydrogen phthalate, $\beta$-hydroxyethyl-$\beta'$-acryloyloxyethyl phthalate, 2-hydroxyethyl acryloyl phosphate, tetrahydrofurfuryl acrylate, benzyl acrylate, phenoxyethyl acrylate, methoxyethyl acrylate, ethoxyethyl acrylate, butoxyethyl acrylate, methoxyethoxyethyl acrylate, stearyl acrylate, lauryl acrylate, ethylene glycol diacrylate, diethylene glycol diacrylate, triethylene glycol diacrylate, 1,6-hexanediol diacrylate, glycerin triacrylate, di-pentaerythritol hexaacrylate, trimethylolpropane triacrylate, bis-(oxyethylenated) Bisphenol A diacrylate, phenyl glycidyl ether acrylate, ethylene glycol glydidyl ether acrylate, propane-1,2-diol glycidyl ether acrylate, trimethylolpropane glycidyl ether acrylate and the acrylate of Bisphenol A type epoxy compound. These acrylic oligomers may be used either in the form of single substance or in the form of a mixture of two or more members. Among them, aliphatic acrylates are preferable, because of their low viscosity and high reactivity. Further, the ingredient (b) is preferably polyfunctional, because it is used for the purpose of forming a 3-dimensional structure. Especially preferred among these acrylates are dipentaerythritolpentacrylate, dipentaerythritol hexacrylate or acrylates of the formula

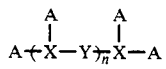

wherein A denotes acryloyl, X is derived from a polyhydric alcohol and Y is derived from a poly-basic acid, n denotes 0 to 3. An example of such acrylates in Aronix ®M-8030. For example, it preferably has 3-6 functional groups in one molecule. Further, the ingredient (b) may have an average molecular weight falling in the range referred to in general literature as a molecular weight of oligomer. That is, said oligomer is usually in the range of monomer-pentamer, and preferably in the range of monomer-dimer. If the compounding ratio of ingredient (b) is less than 1.0 part by weight, the velocity of cure is insufficient. If it exceeds 20 parts by weight, the curing velocity is too rapid to put the composition to practical uses. Thus, its proportion is preferably 2-15 parts by weight.

The amine compound used as ingredient (c) of the invention may be any substance, so far as it is generally known as an amine type curing agent for expoxy resins. For instance, polyamido-amines, aliphatic polyamines, alicyclic polyamines, aromatic polyamines, and tertiary amines are used for this purpose. Its concrete examples include diethylene-triamine, triethylene-tetramine, tetraethylene-pentamine, pentaethylene-hexamine, hexamethylene-diamine, polyether-diamine, bis-hexamethylene-triamine, diethylaminopropylamine, triamine, trimethylhexamethylenediamine, oleylamine, dipropylene-triamine, bis(hexamethylene)-triamine, 1,3,6-tris-aminomethyl-hexane, 3,9-bis(3-aminopropyl)-2,4,8,10-tetraoxaspiro[5,5]-undecane, xylene-diamine, 1,3-bis-aminomethyl-cyclohexane, bis(4-aminocyclohexyl)-methane, bis(4-amino-3-methylcyclohexyl)-methane, isophorone-diamine, N-aminoethyl-piperazine, menthene-diamine, diaminophenylmethane, aniline-formaldehyde low molecular weight condensate, m-phenylenediamine, diaminodiphenyl-sulfone, dimethylaminomethylphenol, tris(dimethyl)-aminoethylphenol and the like. They may be used either in the form of single substance or in the form of a mixture of two or more members. Among them, modified aliphatic amines and aliphatic amides are particularly preferable because of their high reactivity, and especially polyamide-amines, e.g. of the formula $H_2N-R'-NH-(OC-R-CONH-R'-NH)_{\overline{n}}H$, wherein R and R' are alkylene.

If the compounding ratio of ingredient (c) is less than 5 parts by weight, the rapid-curing property of the composition is lost. If it exceeds 150 parts by weight, the two kinds of crosslinked structure are difficult to form. Accordingly, it is preferably in the range of 10-120 parts by weight.

The nitrile rubber having amino terminal group used as ingredient (d) of the invention is not critical, so far as it is a generally known nitrile rubber having amino group on its molecular end. For example, Hycar ATBN (trade name, manufactured by Goodrich Co.; amine equivalent 1200 or 900) is used for this purpose. Other examples of component (d) are the NBR-modified polyamides H-3932 (manufactured by ACR Comp. Tokyo, viscosity 8000 cps/25° C.) or X-3995 (manufactured by ACR, viscosity 4500 cps/25° C.).

If the compounding ratio of ingredient (d) is less than 10 parts by weight, the composition is insufficient in impact resistance. If it exceeds 200 parts by weight, the cured product is too soft. Accordingly, the compounding ratio is preferably in the range of 20-150 parts by weight.

Preferably, the summed amount of ingredient (c) and ingredient (d) is 50-230 parts by weight. If the summed amount is out of the above-mentioned range, the composition cannot cure sufficiently. The ratio of the weight of ingredient (c) to the weight of ingredient (d) is preferably in the range of 3:1 to 1:7. If the ratio is out of this range, the composition is insufficient in flexibility and peeling strength.

If desired, pigment, plasticizer such as phthalic esters, thixotropic agent such as aerosil, carbon black and the like, filler such as talc, calcium carbonate and the like, etc. may be incorporated into the composition of the invention.

The composition of the invention can easily be produced by, for example, uniformly refoaming and agitating a resin component consisting of ingredient (a) and ingredient (b) and a curing agent component consisting of ingredient (c) and ingredient (d) separately by means of a kneader or the like at ordinary temperature, followed by uniformly mixing together both the components by the use of a glass rod or the like at ordinary temperature.

Having the above-mentioned excellent characteristic properties, the composition of the present invention is successfully applicable to various uses requiring flexibility and heat resistance, such as adhesives, coating materials, electrically insulating materials, sealing material for electric parts, etc.

Hereunder, the invention will be illustrated in more detail with reference to the following examples and comparative examples.

WORKING EXAMPLES OF THE INVENTION

Examples 1–3

As resin ingredients, GY 260 (trade name, Bisphenol A type epoxy resin, manufactured by Ciba Geigy), DYO26 (trade name, butanediol diglycidyl ether, manufactured by Ciba Geigy), talc (manufactured by Fuji Talc Co.), Aerosil (trade name, manufactured by Japan Aerosil) Aronix M-8030 (trade name, manufactured by Toa Gousei K.K.) and Aronix M-400 (trade name, manufactured by Toa Gousei K.K.) were used. As curing agent ingredients, Versamide 125 (trade name, manufactured by Henkel, amine equivalent 330–360), Versamide 150 (trade name, manufactured by Henkel, amine equivalent 380–410), diethylene-triamine (DETA), Hycar ATBN (trade name, manufactured by Goodrich, amine equivalent 900), Aerosil and talc were used.

The ingredients shown in the accompanying table were uniformly refoamed and agitated by means of a kneader at ordinary temperature to prepare a resin component and a curing agent component. Then, equal quantities of both the components were introduced into a vessel and uniformly agitated and homogenized by the use of a glass rod at ordinary temperature to obtain an epoxy resin composition of the invention.

In order to evaluate the characteristic properties of the composition thus obtained, the following evaluation tests were carried out. The results were as shown in the table.

EVALUATION TESTS

Gel time 0.5 g of the above-mentioned composition was placed on a hot steel plate (80° C.). While constantly stirring it, the period of time required for losing fluidity was measured.

T Peeling strength

Using a steel plate having a thickness of 0.8 mm, it was measured according to JIS K 6854 (1977).

ISO Peeling strength

Using a sheet molding compound having a thickness of 2.7 mm and a steel plate having a thickness of 0.8 mm, it was measured according to the floating roller method (ISO 4578).

Impact strength

It was measured by the Du Pont impact test which comprised falling a weight weighing 1 kg from a height of 50 cm and visually examining the extent of peeling of the 200 micron coating film provided on the test piece.

Heat resistance (shear strength)

Resin and curing components mentioned above were separately coated on the respective test pieces so as to have a thickness of 200 microns, and than the test places were superposed and stuck to each other. After curing it at 140° C. for 60 minutes, its shear strength was measured in an atmosphere having a temperature of 80° C.

Hot water resistance (shearing strength)

The same test piece as used in the heat resistance test was cured under the same conditions as in heat resistance test, and then it was dipped in a hot water having a temperature of 40° C. for 10 minutes. After a predetermined period of time has passed, its shearing strength was measured at ordinary temperature.

Test specimens used in T Peeling strength and ISO Peeling strength tests

Each test compositions was coaled with a thickness of 300 μm on one side of two steel plates having a size of 200 mm (length)×25 mm (wide)×0.8 mm (thickness), leaving a portion of 50 mm (length)×25 mm (wide) of the both plates uncoated. The two plates were adhered each other by pressure and were cured at 140° C. for 60 min.

Test specimens used in the Du pont impact strength test

Each test compositions was coated with a thickness of 200 μm on one side of a steel plate having a size of 150 mm (length)×70 mm (wide)×0.8 mm (thickness). The plates were cured at 140° C. for 60 min.

Test specimen used in the shearing strength test

Each test composition was coated with a thickness of 200 μm on one side of two steel plates having a size of 100 mm (lenth)×25 mm (wide)×1.6 mm (thickness), leaving a portion of 90 mm (length)×25 mm (wide) uncoated. The coated part of the two plates were adhered by pressure and cured at 140° C. for 60 min.

Comparative Examples 1–5

Comparative compositions having the compounding ratios shown in the table were prepared by repeating the procedure of Example 1. From the compositions, the same test pieces as in Examples were prepared, and they were subjected to the same evaluation tests as in Examples. The results were as shown in the table.

Effect of the Invention

As has been detailed above, the epoxy resin composition of the invention and the cured product thereof are superior to prior ones in the curing velocity of uncured composition and in the impact strength, peeling strength, heat resistance and hot water resistance of cured product, and these properties are well balanced in the cured product of the invention. Accordingly, the composition of the invention is applicable to various uses including adhesives, and its industrial value is very great.

TABLE

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Resin component | GY 260 | 65 | 65 | 65 | 70 | 70 | 65 | 70 | 65 |
| | DYO 26 | 5 | 5 | 5 | 5 | 5 | 5 | 5 | 7 |
| | Aronix M-8030* | 5 | 10 | — | — | — | 10 | — | 10 |
| | Aronix M-400* | — | — | 10 | — | — | — | — | — |

TABLE-continued

|  |  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
|  | Talc | 20 | 20 | 20 | 20 | 20 | 20 | 20 | 20 |
|  | Aerosil | 5 | 5 | 5 | 5 | 5 | 5 | 5 | 5 |
| Curing | Versamide 125* | 50 | 50 | 10 | 70 | 50 | — | — | 70 |
| agent | Versamide 150* | — | — | — | — | — | — | 50 | — |
| component | DETA | 10 | 10 | — | 10 | 10 | — | 10 | — |
|  | ATBN | 30 | 30 | 65 | — | 30 | 65 | 30 | — |
|  | Talc | 25 | 25 | 20 | 25 | 25 | 20 | 25 | 20 |
|  | Aerosil | 5 | 5 | 5 | 5 | 5 | 5 | 5 | 5 |
| Gel time (80° C.) (' = min., " = sec.) | | 3'40" | 2'15" | 1'15" | 11'30" | 15'30" | 3'3" | 14'25" | 2'40" |
| T Peeling strength (kg/cm²) | | 12.5 | 12.5 | 16 | <3 | 6 | 1 | 8 | 4 |
| ISO Peeling strength (kg/cm²) | | 14 | 15 | 20 | <2 | 10 | 1.5 | 12 | 5 |
| Impact strength | | O | O | O | X | O | O | O | X |
| Heat resistance (180° C., kg/cm²) | | 28 | 32 | 44 | 13 | 11 | 9 | 15 | 13 |
| Hot water resistance (40° C., kg/cm²) | | 165 | 172 | 187 | 65 | 73 | 98 | 92 | 97 |

*Aronix product are acrylic oligomers (component b)
**Versamide products are
O: no change
X: broken

We claim:

1. An epoxy resin composition, useful as an adhesive, coating or electrical insulating material, which comprises
   (a) an epoxy resin or mixture of epoxy resins,
   (b) 3-20 parts by weight, per 100 parts by weight of component (a) of any acrylic oligomer having an acrylate functionality of 3 to 6 in one molecule,
   (c) 5-150 parts by weight per 100 parts by weight of component (a) of an amine selected from the group consisting of diethylenetriamine, triethylenetetramine, tetraethylenepentamine, pentaethylenehexamine, hexamethylenediamine, bis-hexamethylenetriamine, diethylaminopropylamine, trimethylhexamethylenediamine, oleylamine, dipropylenetriamine, 1,3,6-tris-aminomethylhexane, 3,9-bis(3-aminopropyl)-2,4,8,10-texraoxaspiro[5.5]undecane, xylenediamine, 1,3-bisaminomethylcyclohexane, bis(4-aminocyclohexyl)methane, bis(4-amino-3-methylcyclohexyl)-methane, isophoronediamine, N-aminoethylpiperazine, menthene-diamine, di(aminophenyl)methane, anilineformaldehyde low molecular weight condensate, m-phenylenediamine, diaminodiphenyl sulfone, dimethylaminomethylphenol, tris(dimethyl)-aminomethyl-phenol, a polyamidoamine of the formula NH$_2$—R'—NH(OC—R—CONH—R'—NH)$_n$—H where R and R' are alkylene, and mixtures of said amines, and
   (d) 10-200 parts by weight per 100 parts by weight of component (a) of a nitrile rubber having a terminal amine group.

2. The epoxy resin according to claim 1 wherein the acrylic oligomer is selected from the group consisting of dipentaerythritolpentacrylate, dipentaerythritolhexacrylate, and acrylates of the formula:

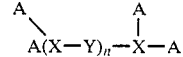

wherein
A is an acryloyl group;
X is the residue of a polyhydric alcohol
Y is the residue from a polybasic acid; and
n is from 0 to 3.

3. The epoxy resin as recited in claim 2 wherein the acrylate has the formula:

$$A(X-Y)_n-X\underset{A}{\overset{A}{<}}$$

A, X, Y and n are therein defined.

4. A composition according to claim 1 containing 3-15 parts by weight of component (b) per 100 parts by weight of component (a).

5. A composition according to claim 1 containing 10-120 parts by weight of component (c) per 100 parts by weight of component (a).

6. A composition according to claim 1 containing 20-150 parts by weight of component (d) per 100 parts by weight of component (a).

7. A composition according to claim 1 wherein the total amount of component (c) plus component (d) is 50-230 parts by weight per 100 parts by weight of component (a).

8. A composition according to claim 7 wherein the weight ratio of component (c) to component (d) is in the range of 3:1 to 1:7.

* * * * *